Sept. 11, 1951          H. L. FULTON          2,567,639
                    PIPE JOINT AND FITTING
Filed April 9, 1948                      3 Sheets-Sheet 1
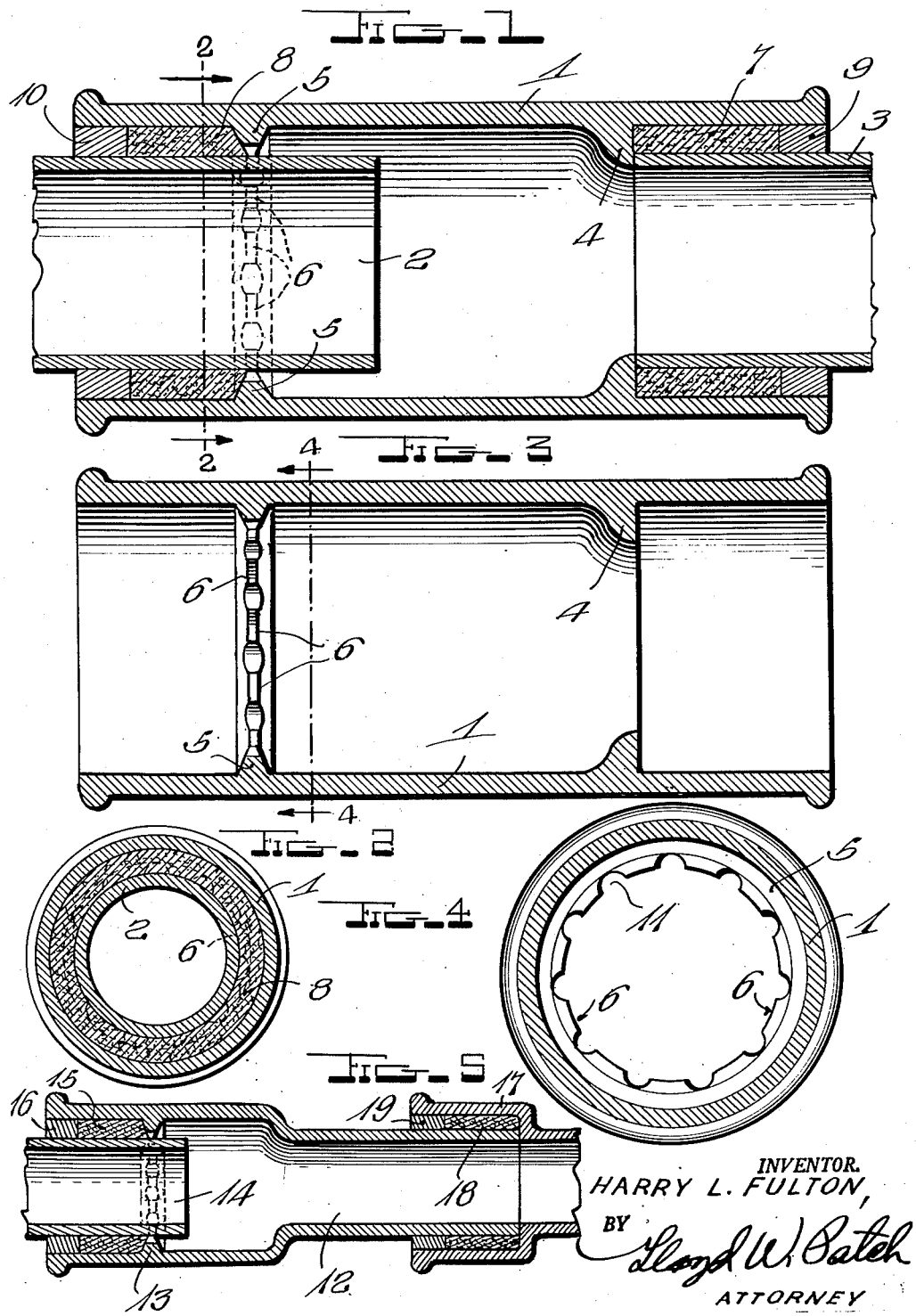
INVENTOR.
HARRY L. FULTON,
BY Lloyd W. Batch
ATTORNEY Sept. 11, 1951 H. L. FULTON 2,567,639
PIPE JOINT AND FITTING
Filed April 9, 1948 3 Sheets-Sheet 2
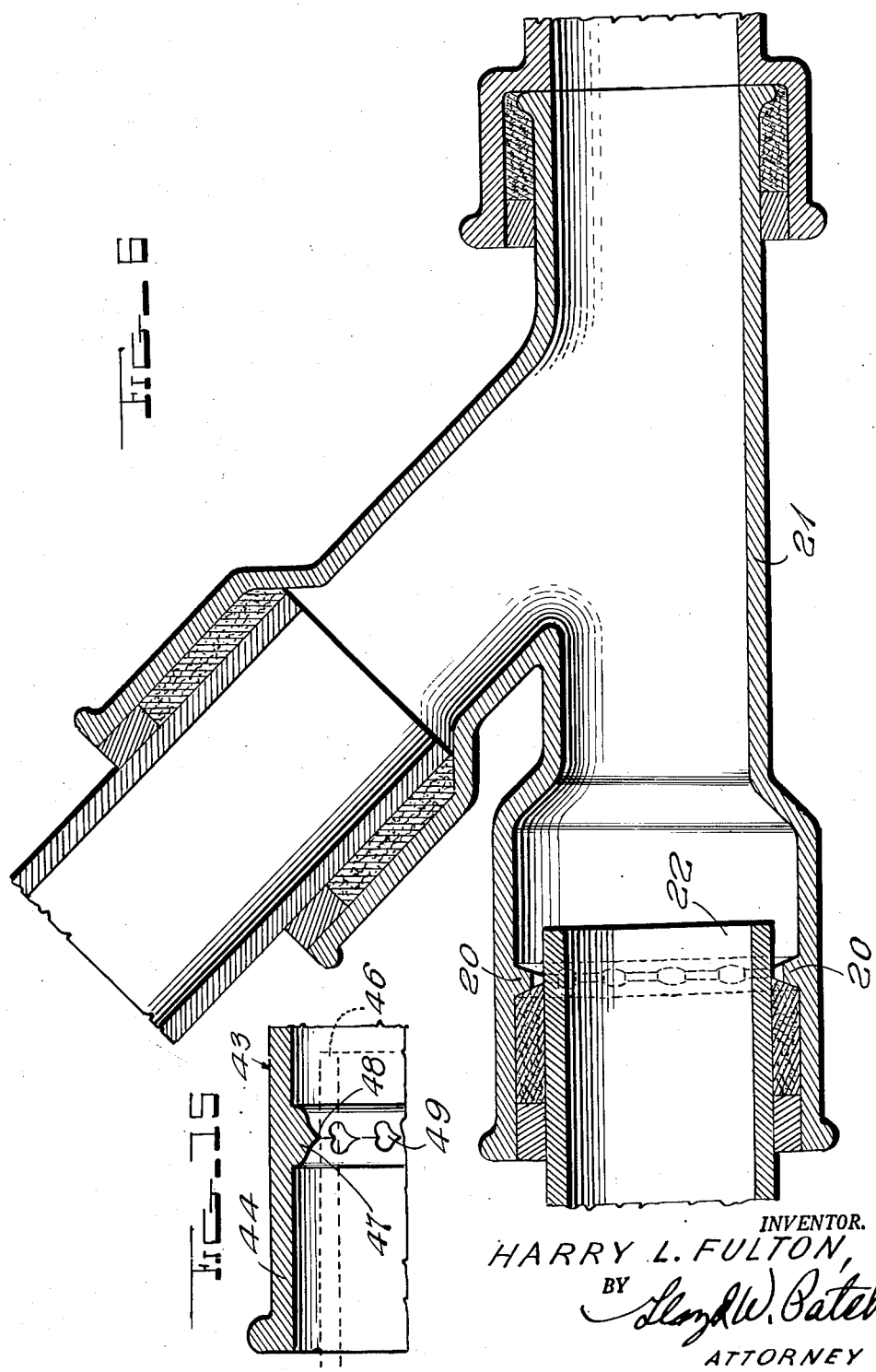

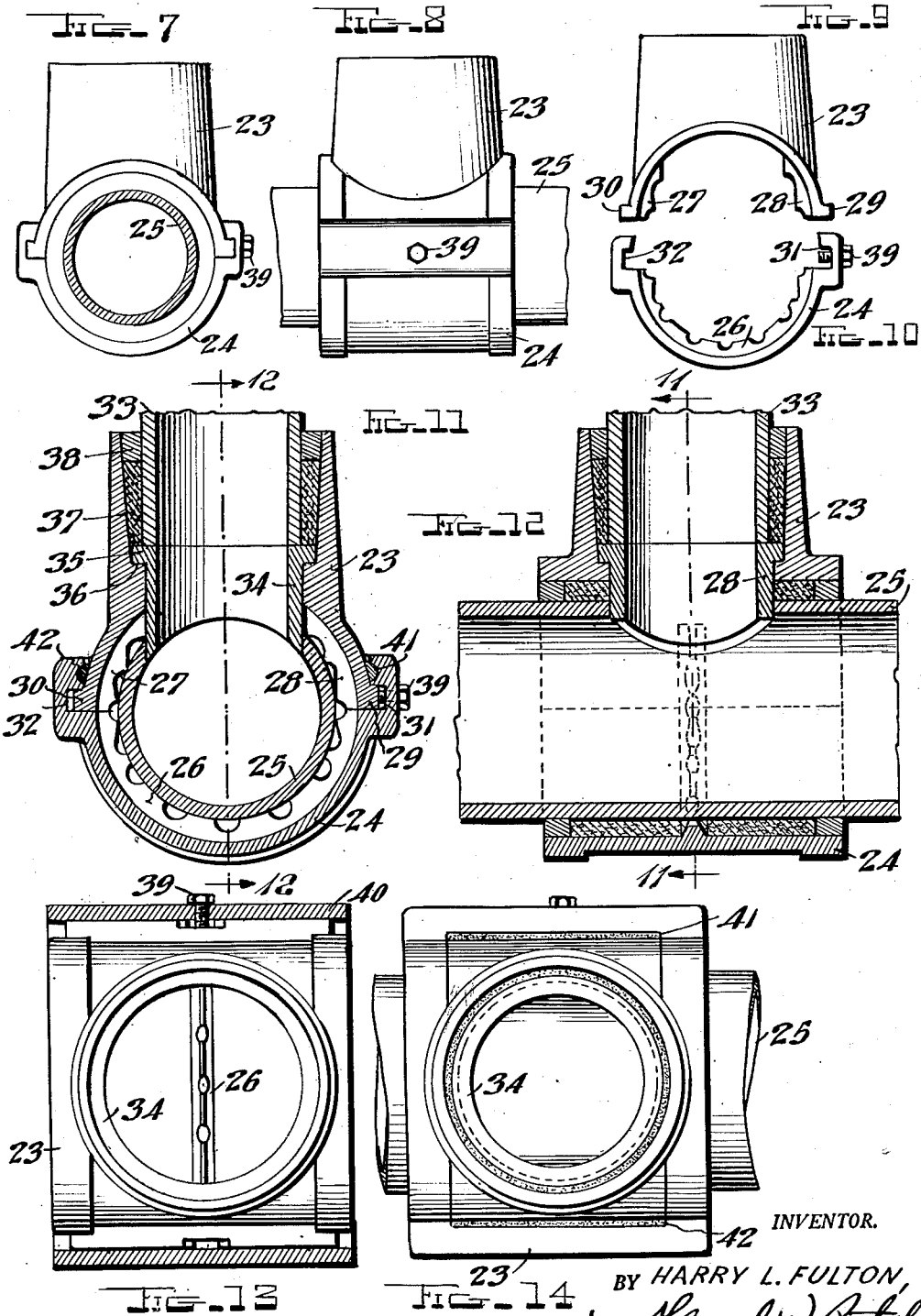

Patented Sept. 11, 1951

2,567,639

UNITED STATES PATENT OFFICE 2,567,639

PIPE JOINT AND FITTING

Harry L. Fulton, Pueblo, Colo.

Application April 9, 1948, Serial No. 20,009

3 Claims. (Cl. 285—115)

My invention relates to an improvement in pipe joints and fittings for jointing pipes or tubular conduits, and more particularly to means adapted to be used for joining together two or more sections of soil pipe and in other like connections.

An object of my invention is to provide means for joining together several sections of soil pipe that comprise a fitting the diametric internal dimensions of which may be increased and varied to accommodate various sizes of soil pipe, or irregularities in a given size.

A further object is to provide means for joining together sections of soil pipe such that a strong, neat, watertight packed joint will result with a minimum expenditure of time and labor.

Another object is to provide means within a soil pipe fitting such that caulking and joint packing may be readily applied in a manner and position that will insure proper and efficient functioning of the joint.

Yet another object of this invention is to provide means for joining two or more soil pipe or other pipe sections that may be employed in situations where the use of such fittings as have been known and used prior to my disclosure would be inconvenient or impossible or impractical.

My invention contemplated the use, in combination with various well known types of soil pipe fittings, of an internal flange portion which may be formed as an integral part of the fitting, and which by virtue of its position and construction will firmly support a pipe or conduit placed within the fitting.

It is well known to those versed in the art that although the inside diameter of two or more soil pipes may be the same, the outside diameters of the pipes may vary widely, this variance being due to the thickness of the pipe walls; and for this reason my invention also contemplates means that will permit enlargement of the inside diametric measurement of an internal flange which has been formed as an integral part of a soil pipe fitting in order that soil pipes of varying or irregular outer dimensions may be accommodated therein.

Still another purpose is to provide a soil pipe or other fitting having an integral internal increasable diameter ring or shoulder adapted to be sized to receive and telescopically fit over the end of a piece of pipe and to surround the pipe as a shoulder against which packing can be caulked.

Another object of my invention is the provision of a separable coupling, T, or other fitting, in combination with an integral internal flange member, in order that said fitting may be utilized to advantage in situations and positions where the use of such fittings as have been known and used prior to my invention would not be possible or practical.

It is with these and other objects in view, some of which will be readily apparent to those skilled in the art, and others of which are a result of the construction, combination, and use of my device, that I shall describe certain specific applications of my invention; however, I do not wish to limit the scope of my invention to these specific disclosures except as it shall be limited by the nature of the device and the appended claims.

In the drawings:

Figure 1 shows a sectional view along the longitudinal axis of a soil pipe coupling in which two pipes have been joined together.

Figure 2 is a transverse sectional view on the line 2—2 of Fig. 1.

Figure 3 is a sectional view similar to Fig. 1 showing the coupling structure without the pipes in place.

Figure 4 is a cross-sectional view on the line 4—4 of Fig. 3.

Figure 5 is a longitudinal sectional view of a modified form of my invention.

Figure 6 shows the use of my invention as a V branch fitting.

Figure 7 is an end view showing a pipe T provided with a split coupling with which my invention has been incorporated.

Figure 8 shows a side view of the T coupling of Fig. 7.

Figure 9 shows one section of a split coupling pipe T in which my device has been embodied.

Figure 10 shows the corresponding section of the split coupling of Fig. 9.

Figure 11 shows a cross-sectional view of a split coupling pipe T in which my invention is embodied and in which I have provided a detachable nozzle to be used with the T.

Figure 12 is a sectional view on the line 12—12 of Fig. 11.

Figure 13 is a partially sectional view looking at the top of the coupling of Fig. 12.

Figure 14 is a view looking at the top of the coupling of Fig. 12.

Figure 15 is an enlarged fragmentary sectional view showing another form or embodiment of integral internal increasable diameter ring or shoulder.

In the embodiment illustrated in Fig. 1, I have shown a coupling member 1, by means of which a joint is made between pipes 2 and 3.

To accomplish this joining the coupling member 1, is placed on the pipe 3 in such a manner that the interior abutment 4 of the coupling is in close relation to the end of pipe 3. The internal diametric dimensions of the integral internal flange or ring or shoulder portion 5 are adjusted at this time by filing or other abrading processes in order to insure the closest possible contact between the supporting portions 6 of the flange 5 and the exterior wall of the pipe 2. When this fitting process has been accomplished and both of the pipes 2 and 3 are in place, the joints may be caulked by any of the means known to those skilled in the art. In the present instance I have shown the use of oakum or other caulking yarn 7 and 8 with lead 9 and 10 run into the joint and caulked to complete the seal.

It will be noted that when the caulking yarn oakum or other packing 8 is applied it will be forced into close relation with the exterior wall of pipe 2 at the juncture of the pipe with internal flange 5. This packing action is caused by the sloped face of the flange 5, which acts as a cam surface to cause the yarn 8 to be fully seated in the recess of the joint, thus avoiding the formation of pockets of imperfectly packed material through which leaks might occur.

Reference to Fig. 4 will render more apparent to those versed in the art the means by which I have found it possible to vary the internal diametric dimensions of my device in order to accommodate various sizes of pipe. Within the body of the coupling member 1 is formed, as an integral part of soil member, a flange member 5 extending substantially circumferentially about a portion of the interior of the coupling. This ring or flange 5 is of substantially triangular or knife-edged shape in cross-section, tapering from the base to the supporting portions 6, and is provided with recesses 11 cast or formed in its inner circumference which somewhat reduce the labor of fitting without in the least impairing the efficiency or strength of the joint. By means of filing or other abrading action upon the supporting portions 6, it is possible to make an exact fit between the inner edge of the ring or flange 5 and the outside, any of several sizes of pipe, thus insuring an extremely tight and firm joint.

In Fig. 5 I have shown the use of my invention as adapted to a bell and spigot joint such as might be used in the construction of a line of soil pipes for carrying a sewage effluent or other liquid. The bell of a length of soil pipe 12 has been provided with an interior ring or integral flange 13 within which a pipe 14 is supported. The joint thus made has been caulked with yarn 15, and has been run with lead 16. By way of contrast I have further shown at the right hand end, the construction of a well known type of joint in which the bell 17 has been placed upon the pipe 12 and the joint thus achieved has been caulked or filled with yarn 18 and lead 19. The joint produced by the use of my invention provides support for the pipe 14 in two places; first, where the flange 13 grasps the pipe 14, and second, where the lead 16 has been run, making a rigid joint whose seal can not be broken by settling or contortion of the pipe line.

Figure 6 further illustrates the adaptability of my invention to all types of soil pipe fittings. Here I have shown an internal integral ring or flange 20 as it would be located within one of the bells of a Y-branch fitting 21. The pipe 22 is fitted into the opening of the ring or flange 20 and the joint is filled in the conventional manner.

A further modification may be achieved by the combination of my invention with a split coupling of the 90°=T type. Figures 7 and 8 illustrate the use of two sections 23 and 24 of a split coupling T to provide a connection between the through conduit 25 and a branch line. In Figures 9 and 10 the particular construction and combination of my device may be seen. Within the section 24 of the split coupling I have formed a semi-circular segment of a ring or flange portion 26, and within the section 23 I have formed two segments of a flange 27 and 28, the relative positioning of which I shall set forth later.

It is intended that section 23 of the split T will be joined to the section 24 by means of the projection ears 29 and 30 which are designed to be slidably engaged by the grooves 31 and 32 of section 24, when this section 24 is fitted with section 23 and is moved endwise.

With particular reference to Fig. 11 I facilitate the use of a T coupling composed of sections 23 and 24 in joining a lateral pipe 33 to the through conduit 25 by the provision of a nozzle or sleeve or ferrule member 34 which is fitted into a suitable opening formed in the conduit 25. An extended edge portion 35 of the nozzle 34 rests securely upon a shoulder 36 within the 90° branch of the coupling section 23, and serves as a firm bearing surface for the end of the lateral 33 and for the caulking yarn 37 and lead 38.

The segmental flanges 27 and 28 are designed to fit closely against or about the nozzle 34 so that in combination with the semi-circular flange 26 they will furnish support to the greatest portion of the conduit 25 and insure a tight and leak-proof connection and satisfactory results when the joint is caulked.

As shown in Fig. 13 I have determined that the employment of a set screw 39 in one of the grooved members 40 of the section 24 greatly increases the ease of assembly of the fitting. The member 40 is drilled and tapped to hold the screw 39 in such a position as to make possible the frictional engagement of the projecting ear 29 when the sections 23 and 24 are slidably joined, thus firmly holding the fitting together until lead or other sealing compound can be poured into the ports 41 and 42 to permanently join the fitting.

In the embodiment as illustrated in Fig. 15, the fitting 43 has a bell and 44 adapted to receive and secure and couple the end of a pipe as indicated by the dotted line 46. The integral internal increasable diameter ring or shoulder 47 is made of different shape or form with its sides presenting compound curved faces. This ring or shoulder 47 has its inner diameter made as a thin edge 48, having an annular series of spaced recesses 49 therein, and thus when it becomes necessary to increase the size of the opening through the fitting this can be readily accomplished by cutting away this thin edge 48 by use of a file, reamer, grinding wheel or other tool, or in any other desired or suitable manner.

With the internal ring or shoulder 47 of the shape shown in Fig. 15, when caulking material is placed and is packed or caulked around the pipe 46, and within the bell 44 of fitting 43, the compound curved surfaces of the ring or shoulder 47 will serve to wedge and pack the caulking material in tight and leak-proof relationship. Obviously the integral internal increasable diameter ring or shoulder can be made of various sizes and shapes, and the recesses can be of various shapes and spacing to suit different conditions and requirements of use.

It will be appreciated that my improved pipe joint and fitting can be used to provide a permanent connection between two lines or lengths of soil pipe; and, that due to their construction these joints or fittings can be made as various types of fittings and can be used in many instances where it would be impractical and often impossible to use and apply the ordinary or usual joints or fittings. Obviously, lead wool or thin strips of sheet lead can be used in place of the caulking yarn and the poured lead, and in fact, my joint or fitting lends itself to use and employment of substantially any and all standard procedures and practices as now known to and used by plumbers and other users.

While forms of my invention described in the foregoing specification are those which I have constructed and tested and are known to me to be admirably suited to the uses for which they are intended, it will be readily apparent to those skilled in the art that many changes and modifications may be made in my invention and in the manner of adapting and applying the same to different fittings without altering to an appreciable extent the spirit and principles thereof. It is for this reason that I do not wish to limit myself to the exact construction and arrangement of the several parts herein shown in carrying out my invention in practice except as hereinafter claimed.

I claim:

1. A pipe joint and fitting comprising a tubular body portion having an open end thereof adapted to telescopically and loosely receive the end of a pipe to be joined, and said body portion being provided with an integral internal increasable diameter ring flange presented as a caulking ledge around the pipe, said ring flange having the inner diametral edge thereof provided with an annularly spaced series of recesses.

2. A pipe joint and fitting comprising a tubular body portion having an open end thereof adapted to telescopically and loosely receive the end of a pipe to be joined, and said body portion being provided with an integral internal increasable diameter ring flange presented as a caulking ledge around the pipe, said ring flange having the inner diametral edge thereof provided with an annularly spaced series of recesses, and caulking within the open end of the body portion around the pipe and caulking against the caulking ledge.

3. A pipe joint and fitting comprising a tubular body portion having an open end thereof adapted to telescopically and loosely receive the end of a pipe to be joined, said body portion being provided with an integral internal increasable diameter ring flange presented around the pipe as a caulking ledge, and said ring flange being provided on its inner diameter with an annularly spaced series of recesses and having portions thereof between the recesses made as a thin edge to thereby facilitate removal of material for increasing the diameter of the opening through the ring flange.

HARRY L. FULTON.

REFERENCES CITED

The following references are of record in the file of this patent:

UNITED STATES PATENTS

| Number | Name | Date |
| --- | --- | --- |
| 329,265 | Gleich | Nov. 6, 1888 |
| 799,954 | Vanderman | Sept. 19, 1905 |
| 1,225,777 | Craig | May 15, 1917 |
| 1,367,312 | Ford | Feb. 1, 1921 |
| 1,492,520 | Meyer | Apr. 29, 1924 |